(12) United States Patent
Voreck (10) Patent No.: US 10,236,970 B2
(45) Date of Patent: Mar. 19, 2019

(54) REDUNDANT TELEMETRY TRANSMISSION PATH

(71) Applicant: Space Systems/Loral, LLC, Palo Alto, CA (US)

(72) Inventor: Richard Wallace Voreck, Portola Valley, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 577 days.

(21) Appl. No.: 14/670,141

(22) Filed: Mar. 26, 2015

(65) Prior Publication Data

US 2016/0285543 A1 Sep. 29, 2016

(51) Int. Cl.
*H04B 7/185* (2006.01)

(52) U.S. Cl.
CPC ..... *H04B 7/18519* (2013.01); *H04B 7/18515* (2013.01)

(58) Field of Classification Search
CPC . H04B 7/18519; H04B 7/18515; G07C 5/008
See application file for complete search history.

(56) References Cited

U.S. PATENT DOCUMENTS

| | | | |
|---|---|---|---|
| 5,855,341 A * | 1/1999 | Aoki | B64G 1/1085 244/158.8 |
| 6,006,075 A * | 12/1999 | Smith | H04B 1/713 375/299 |
| 6,160,858 A * | 12/2000 | Hindman | H04L 27/2273 375/274 |
| 6,597,892 B1 | 7/2003 | Caldwell, III et al. | |
| 6,735,501 B1 | 5/2004 | Rulison et al. | |
| 6,864,835 B1 | 3/2005 | Taur et al. | |
| 8,483,888 B2 | 7/2013 | Boileau et al. | |
| 2004/0120291 A1 | 6/2004 | Nasta et al. | |
| 2009/0111390 A1* | 4/2009 | Sutton | H04B 1/40 455/77 |
| 2012/0147812 A1 | 6/2012 | Hudson et al. | |
| 2013/0148570 A1* | 6/2013 | Miller | H04W 88/04 370/316 |
| 2015/0304021 A1* | 10/2015 | Rudrapatna | H04B 7/18532 370/317 |

FOREIGN PATENT DOCUMENTS

WO WO 2009/008640 4/2009

* cited by examiner

*Primary Examiner* — Alex Skripnikov
*Assistant Examiner* — Nicole King
(74) *Attorney, Agent, or Firm* — Weaver Austin Villeneuve & Sampson LLP (57) ABSTRACT

Techniques are disclosed for providing a redundant telemetry transmission path on a spacecraft. The spacecraft includes a telemetry (TLM) transmitter having a modulation input coupled by a commandable switch with a signal source. The TLM transmitter is configured to receive an output from the signal source when the commandable switch is closed. The computer is configured to encode TLM data bits onto a TLM downlink signal by actuating the commandable switch, such that a signal from the signal source received by the TLM transmitter is temporally varied between an on condition and an off condition.

19 Claims, 6 Drawing Sheets

REDUNDANT TELEMETRY TRANSMISSION PATH

TECHNICAL FIELD

This invention relates generally to spacecraft and, in particular, to techniques for providing a redundant telemetry transmission path for such spacecraft.

BACKGROUND

The assignee of the present invention manufactures and deploys spacecraft for, inter alia, communications and broadcast services.

Such a spacecraft includes a telemetry, command and ranging (TC&R) subsystem, that enables a ground control station ("ground station") to command the spacecraft, monitor performance and health of the spacecraft, and determine the spacecraft's position (range) with respect to the ground station.

The TC&R subsystem equipment will normally be provided with at least 2:1 redundancy and the spacecraft can therefore tolerate, with no degradation in performance, a failure of at least a single component within the TC&R subsystem. Nevertheless, because a failure of the TC&R subsystem may result in complete loss of the entire spacecraft, techniques for mitigating impacts of component failures are desirable. For example, U.S. Pat. No. 6,735,501, assigned to the assignee of the present disclosure, and hereby incorporated into the present disclosure in its entirety for all purposes, describes techniques for mitigating impacts of failures within a spacecraft command subsystem.

SUMMARY

The present inventor has appreciated that modulation of a ranging tone onto a carrier signal may enable a spacecraft to continue transmission of TLM data to a ground station, notwithstanding complete loss of ordinary telemetry encoder functionality, and without adding additional hardware to the TC&R subsystem.

According to some implementations, a spacecraft includes a computer and a telemetry (TLM) transmitter having a modulation input coupled by a commandable switch with a signal source. The TLM transmitter is configured to receive an output from the signal source when the commandable switch is closed. The computer is configured to encode TLM data bits onto a TLM downlink signal by actuating the commandable switch, such that a signal from the signal source received by the TLM transmitter is temporally varied between an on condition and an off condition.

In some examples, the signal source may be a command (CMD) receiver, the CMD receiver having an output coupled by the commandable switch with the modulation input of the TLM transmitter. The output from the CMD receiver may result from demodulation of a modulated uplink carrier signal. The modulated uplink carrier signal may be a ranging signal.

In some examples, the output from the CMD receiver received by the TLM transmitter may be noise.

In some examples, the commandable switch may be solid state. In some examples, the spacecraft may include a TLM encoder coupled with the TLM transmitter and with the computer. The computer may be configured to detect a failure of the TLM encoder, and, only upon failure of the TLM encoder, encode TLM data bits onto the TLM downlink signal by actuating the commandable switch. In some examples, the computer may include at least a portion of the TLM encoder.

In some examples, the TLM data bits may be encoded at a rate between 8 and 200 bits per second. In some examples, the TLM transmitter may modulate the output from the CMD receiver received by the TLM transmitter onto an RF carrier using phase modulation or frequency modulation.

According to some implementations, a method includes encoding, with a computer, TLM data bits onto a TLM downlink signal by actuating a commandable switch, the commandable switch being disposed between and communicatively coupled with a signal source and a telemetry transmitter of a spacecraft, and transmitting, with the TLM transmitter, the encoded TLM downlink from the spacecraft to a ground station. The TLM transmitter is configured to receive an output from the signal source when the commandable switch is closed. The computer is configured to actuate the commandable switch, such that a signal received by the TLM transmitter is temporally varied between an on condition and an off condition.

According to some implementations, a non-transitory computer readable medium has software stored thereon, the software including instructions for causing a computer to: encode TLM data bits onto a TLM downlink signal by actuating a commandable switch, the commandable switch being disposed between and communicatively coupled with a signal source and a telemetry TLM transmitter of a spacecraft. The TLM transmitter is configured to receive an output from the signal source when the commandable switch is closed and to transmit the encoded TLM downlink from the spacecraft to a ground station. The computer is configured to actuate the commandable switch, such that a signal received by the TLM transmitter is temporally varied between an on condition and an off condition.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit a spacecraft to continue transmission of telemetry data to a ground station, notwithstanding partial or complete loss of ordinary telemetry encoder functionality, and without adding additional hardware to the TC&R subsystem.

Figure 1:
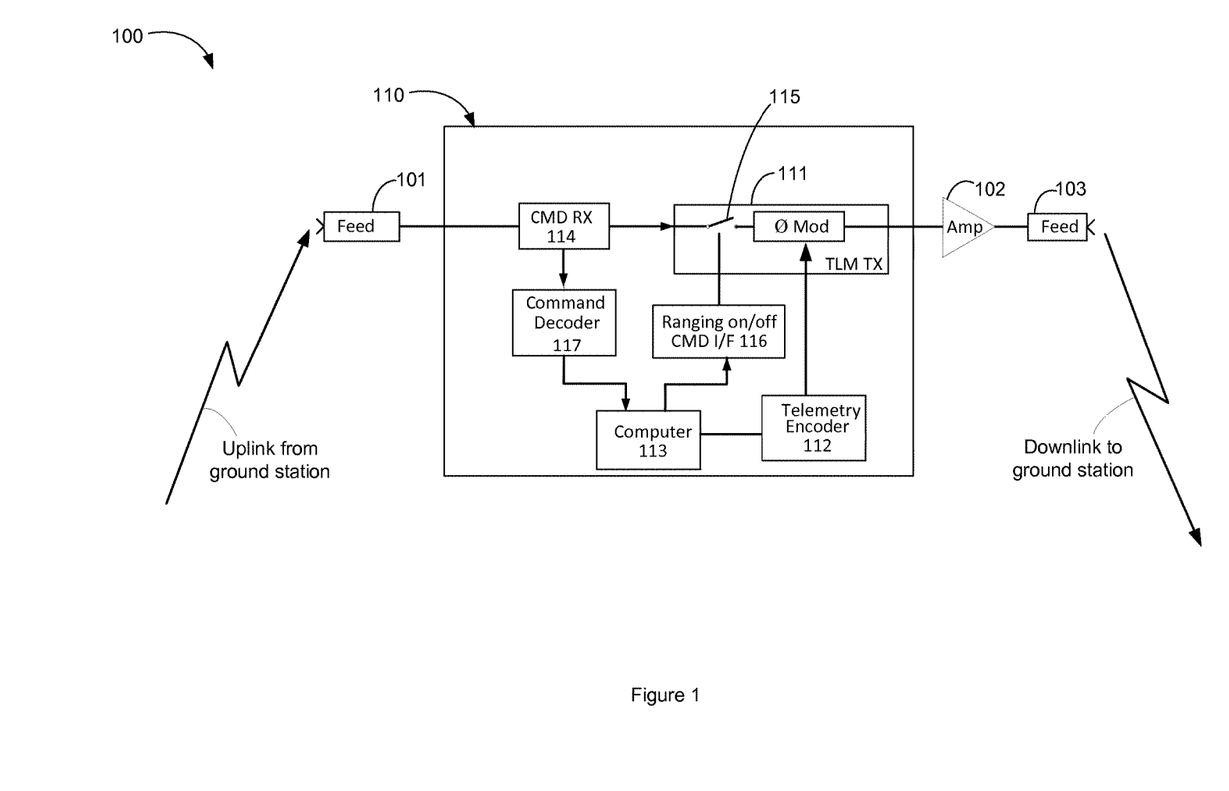
FIG. 1 illustrates a simplified block diagram of an example implementation of a TC&R subsystem, according to the presently disclosed techniques.

FIG. 1 illustrates a simplified block diagram of a spacecraft 100 that includes a TC&R subsystem 110. The TC&R subsystem 110 includes a telemetry (TLM) transmitter (Tx) 111 and a TLM encoder 112. The TLM encoder 112 is communicatively coupled with the TLM transmitter 111 and with an on board computer 113. In some implementations, the TLM encoder 112 may be a module (tray or "slice") of the on board computer 113. Whether or not this is so, the TLM encoder 112 receives spacecraft telemetry data from the on board computer 113. The spacecraft telemetry data may include operational and environmental data regarding the performance, status and "health" of any number of spacecraft payload and bus subsystems. The TLM encoder 112, in the absence of a failure, processes ("encodes") the telemetry data received from the on board computer 113 into a bitstream that is forwarded to the TLM transmitter 111 for transmission over a downlink to a ground station. More particularly, the TLM transmitter 111 may phase (Ø) modulate the bitstream onto an RF carrier signal. The phase modulated RF carrier signal may be forwarded, after amplification at amplifier 102 to feed 103 and downlinked to the ground station.

The TC&R subsystem 110 also includes provisions for command reception and processing, and for ranging. With regard to command receiving, in the illustrated implementation, commands may be uplinked from a ground station, received by feed 101 and forwarded to a command ("CMD") receiver 114. Outputs from the CMD receiver 114 may be forwarded to CMD decoder 117. In some implementations, the CMD decoder 117 may be a module of the on board computer 113. Whether or not this is so, the CMD decoder 117 forwards command signals to the on board computer 113.

The TC&R subsystem 110 also includes provisions for supporting ranging operations. Ranging operations may ordinarily be carried out at approximately hourly, daily or weekly intervals, each operation requiring on the order of 10-100 seconds of time, for example. During a ranging operation, the on board computer 113 may cause a ranging on/off CMD interface 116 to close switch 115. In some implementations, the ranging on/off CMD interface 116 may be a module of the on board computer 113. When switch 115 is in a closed position closed, a ranging tone uplinked from the ground station and received by feed 101 is forwarded to CMD receiver 114. The CMD receiver 114 forwards the demodulated ranging tone to TLM transmitter 111 for transmission over the downlink to the ground station. A difference in phase between the uplinked ranging tone and the downlinked ranging tone may be measured and used to measure the range of the spacecraft from the ground station.

The present inventor has appreciated that the on board computer 113 may advantageously be configured to encode telemetry data bits onto an RF carrier signal by using the above-described "Ranging ON/OFF" function. More particularly, telemetry data bits may be encoded onto an RF carrier signal by switching, with the commandable switch 115, a ranging tone output from the command receiver to the TLM transmitter 111. More particularly, in some implementations, switch 115 may be pulsed between an open position and a closed position by the ranging on/off CMD interface 116 so as to selectably couple and uncouple the ranging tone output to a modulation input of the TLM transmitter 111. In some implementations, ranging on/off CMD interface 116 may provide a pulse command interface with the TLM transmitter 111.

The switch 115 may be a solid state switch and may have a cycle life and switching speed well in excess of the requirements implied by the added functionality described herein. In some implementations, switch 115 may be actuatable at a switching rate of up to approximately 200 cycles per second.

In some implementations, an uplink from the ground station to the CMD receiver 114 may be established with nominal FM modulation and a ranging-like tone. The CMD receiver 114 may demodulate the ranging-like tone, and the demodulated ranging tone may be forwarded (when switch 115 is closed) to the TLM transmitter 111 via existing ranging pathways. The demodulated ranging-like tone may be phase modulated onto an RF carrier by the TLM transmitter 111. By actuating switch 115 between open and closed positions, an already available "Ranging ON/OFF" function may be used to encode telemetry bits over a downlink RF carrier signal. In some implementations, the Ranging ON/OFF functions may be activated by the on-board computer 113, using a pulse command interface which enables the TLM encoder 112 to be bypassed.

In some implementations, an output from the CMD receiver received by the TLM transmitter may be temporally varied between an on condition and an off condition irrespective of whether an uplink from the ground station has been established, or the nature of the uplink. For example, the output from the command receiver received by the TLM transmitter when the commandable switch 115 is closed may be noise instead of a demodulated ranging tone or other signal related to the ranging tone.

Figure 2:
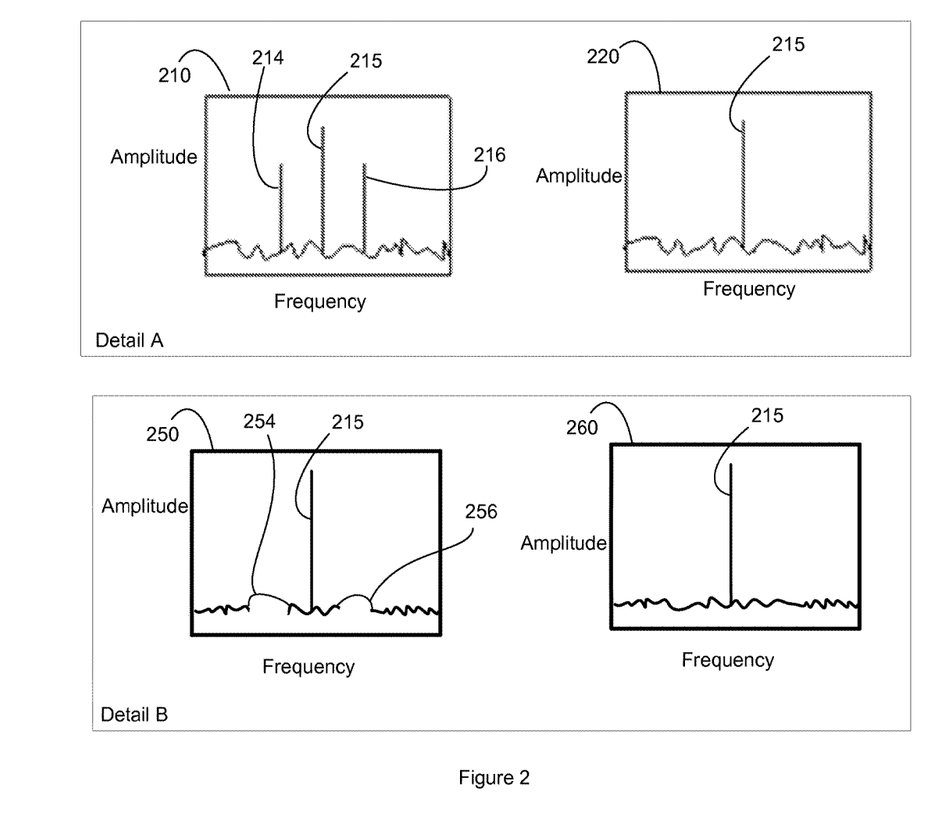
FIG. 2 illustrates examples of encoding telemetry bits over the downlink RF carrier signal.

FIG. 2 illustrates examples of encoding telemetry bits over the downlink RF carrier signal. Referring first to Detail A of FIG. 2, plots 210 and 220 illustrate an example of encoding telemetry bits over the downlink RF carrier signal using the ranging tone for modulation. In plots 210 and 220, amplitude of the downlink RF carrier signal is plotted as a function of frequency, where a downlink TLM carrier frequency is represented by an amplitude spike 215. Whether the Ranging ON/OFF function is in the ON state or the OFF, the spike 215 may ordinarily be expected to be present at the telemetry carrier frequency, for example, in some implementations at about 12 GHz. When the Ranging ON/OFF is in the ON state, as illustrated in plot 210, additional amplitude spikes 214 and 216 may be observed. The amplitude spikes 214 and 216 may ordinarily be expected to be present at frequencies separated from the carrier frequency by an amount corresponding to the frequency of the ranging tone. For example, for a 28 KHz ranging tone, and a 12 GHz telemetry carrier frequency, spike 214 may be expected to be present at 11.999972 GHz and spike 216 may be expected to be present at 12.000028 GHz.

Plot 210 illustrates a modulated TLM downlink spectrum where the modulation indicates an ON state (which may indicate, for example, a "one" bit in a telemetry stream). Plot 220 illustrates an unmodulated TLM downlink spectrum where the lack of modulation indicates an OFF state (which may indicate a "zero" bit in the telemetry stream). In plot 210, amplitude spikes 214 and 216 correspond, respectively, to a lower phase modulated sideband and an upper phase modulated sideband of the downlink TLM carrier represented by the amplitude spike 215. Referring now to Detail B of FIG. 2, plots 250 and 260 illustrate an example of encoding telemetry bits over the downlink RF carrier signal using noise for modulation. In plots 250 and 260, amplitude of the downlink RF carrier signal is plotted as a function of frequency, where the downlink TLM carrier frequency is represented by the amplitude spike 215. More particularly, plot 250 illustrates a modulated TLM downlink spectrum where the modulation indicates an ON state (which may indicate, for example, a "one" bit in a telemetry stream). Plot 260 illustrates an unmodulated TLM downlink spectrum where the lack of modulation indicates an OFF state (which may indicate a "zero" bit in the telemetry stream). In plot 250, amplitude trace portions 254 and 256 correspond, respectively, to a lower phase modulated noise sideband and an upper phase modulated noise sideband of the downlink TLM carrier represented by the amplitude spike 215.

Figure 3A:
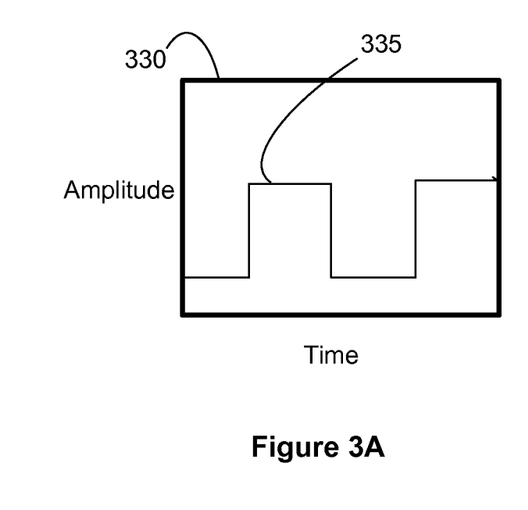
FIGS. 3A and 3B illustrate time domain representations of encoded TLM downlink transmissions after demodulation and processing on the ground.
Figure 3B:
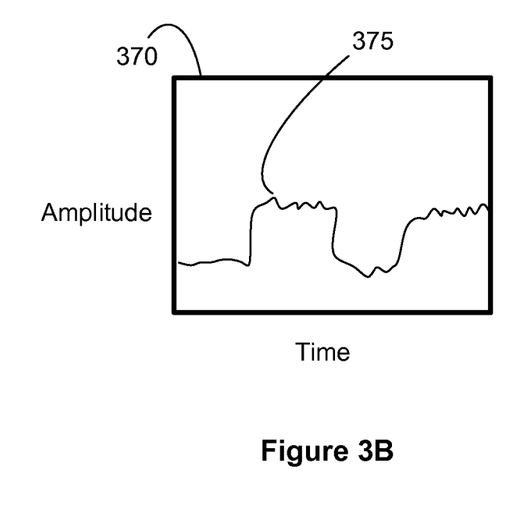

Referring now to FIGS. 3A and 3B, time domain representations of encoded TLM downlink transmissions after demodulation and processing on the ground are illustrated. Referring first to FIG. 3A, plot 330 illustrates telemetry downlink baseband signal amplitude as a function of time where the ranging tone is used for modulation. More particularly, amplitude trace 335 represents an example of sideband signal level versus time for a bitstream encoded using phase modulation as described hereinabove. The amplitude trace 335 may undergo threshold detection to recover the bitstream. Referring to FIG. 3B, plot 370 illustrates telemetry downlink noise sideband signal amplitude as a function of time where the noise is used for modulation. More particularly, amplitude trace 375 represents an example of sideband signal level versus time for a bitstream encoded using noise as described hereinabove. The amplitude trace 375 may undergo threshold detection to recover the bitstream.

In some implementations, the computer 113 may be configured to detect a failure of the TLM encoder. In such implementations, the computer may encode TLM data bits onto the TLM downlink signal by actuating the commandable switch only upon detection of the failure of the TLM encoder.

Figure 4:
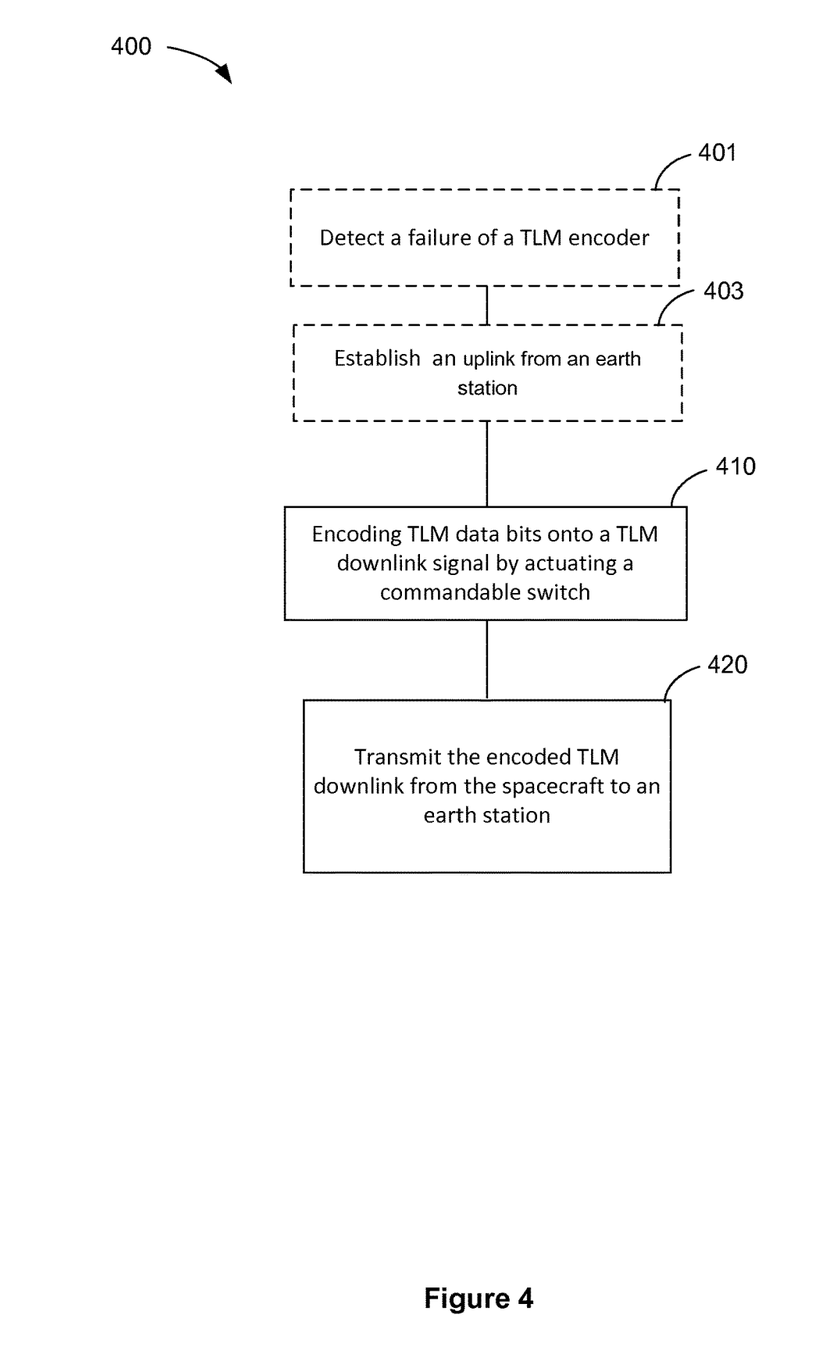
FIG. 4 illustrates a method of providing a redundant telemetry transmission path for a spacecraft.

Referring now to FIG. 4, a method 400 of providing a redundant telemetry transmission path for a spacecraft is illustrated. The method 400 may begin, at block 410 with encoding TLM data bits onto a TLM downlink signal by actuating a commandable switch. As described hereinabove, actuating the commandable switch may cause an output of a command receiver received by a TLM transmitter to be temporally varied between an on condition and an off condition. In some implementations, the output of the command receiver may be noise. In some implementations, the TLM data bits may be encoded by actuating the commandable switch at a rate between 8 and 200 bits per second.

The method may continue, at block 420 with transmitting the encoded TLM downlink from the spacecraft to a ground station. In some implementations, the method 400 may include one or both of optional blocks 401 and 403, which may be executed prior to block 410. In implementations that include optional block 401, the method 400 may commence with detecting a failure of a TLM encoder. The failure may be detected by computer 113, for example.

Whether or not the method 400 includes block 401, in some implementations, execution of optional block 403 includes establishing an uplink from a ground station prior to executing block 410. The uplink may include a ranging-like tone as described hereinabove.

Figure 5:
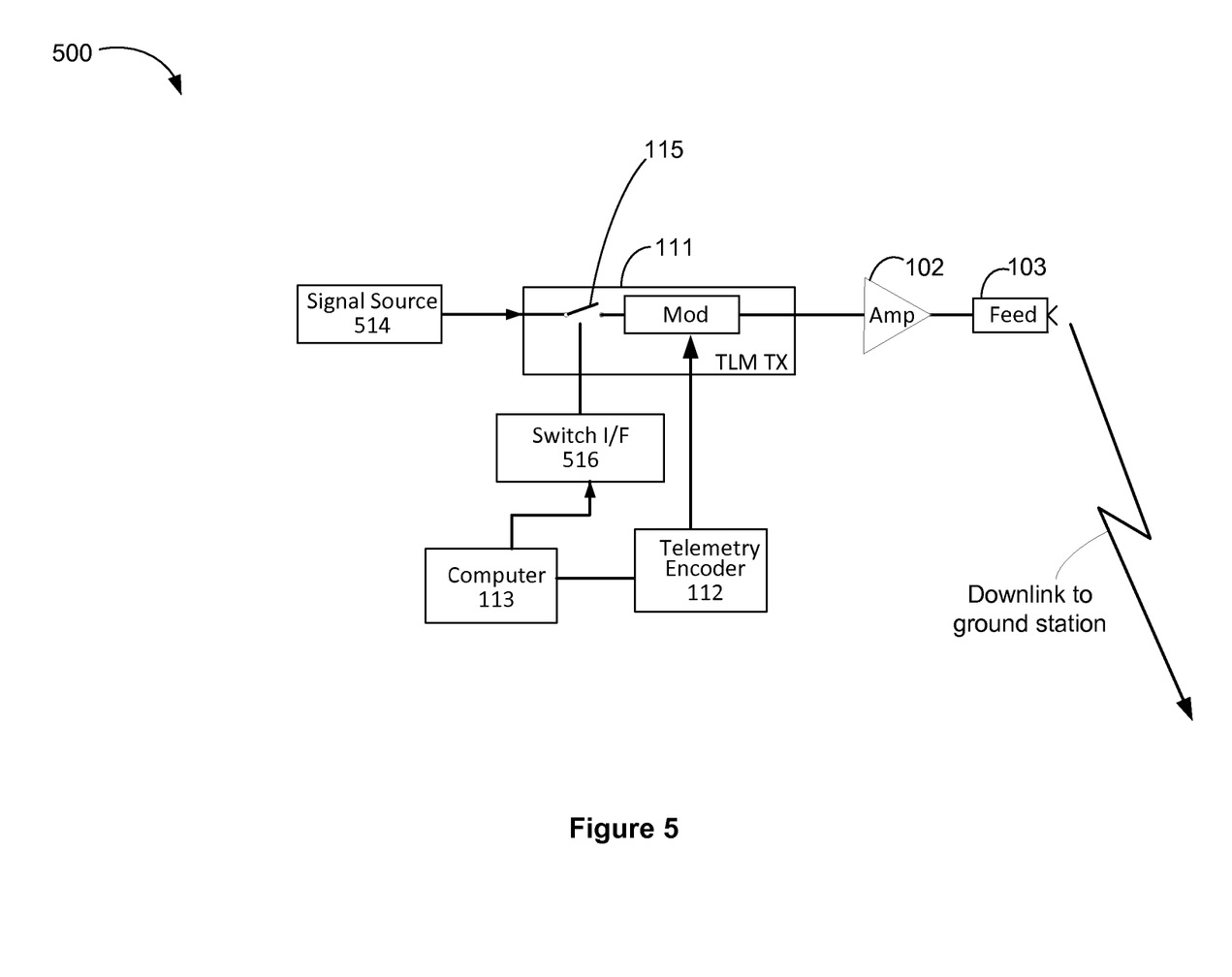
FIG. 5 illustrates a simplified block diagram of a spacecraft, according to a further implementation.

FIG. 5 illustrates a simplified block diagram of a spacecraft 500 that includes the TLM transmitter (Tx) 111 and the TLM encoder 112. The TLM encoder 112 is communicatively coupled with the TLM transmitter 111 and with the on board computer 113 and receives spacecraft telemetry data from the on board computer 113. As described hereinabove, the TLM encoder 112, in the absence of a failure, encodes the telemetry data received from the on board computer 113 into a bitstream that is forwarded to the TLM transmitter 111 for modulation and transmission over a downlink to a ground station. For example, a phase modulated RF carrier signal may be forwarded, after amplification at amplifier 102 to feed 103 and downlinked to the ground station.

In the illustrated implementation, the TLM transmitter 111 may be selectably coupled with a signal source 514 by way of the commandable switch 115. The commandable switch 115 may be opened or closed by way of a switch interface 516 under control of the computer 113. In some implementations, the switch interface 516 may be a module of the on board computer 113.

Thus, the on board computer 113 may be configured to encode telemetry data bits onto an RF carrier signal by temporally varying the position of the commandable switch 115. For example, telemetry data bits may be encoded onto the RF carrier signal by switching, with the commandable switch 115, a signal output from the signal source 514 to the TLM transmitter 111. More particularly, in some implementations, the switch 115 may be pulsed between an open position and a closed position by the switch interface 516 so as to selectably couple and uncouple the signal output from the signal source 514 to a modulation input of the TLM transmitter 111. In some implementations, the switch interface 516 may provide a pulse command interface with the TLM transmitter 111.

Figure 6:
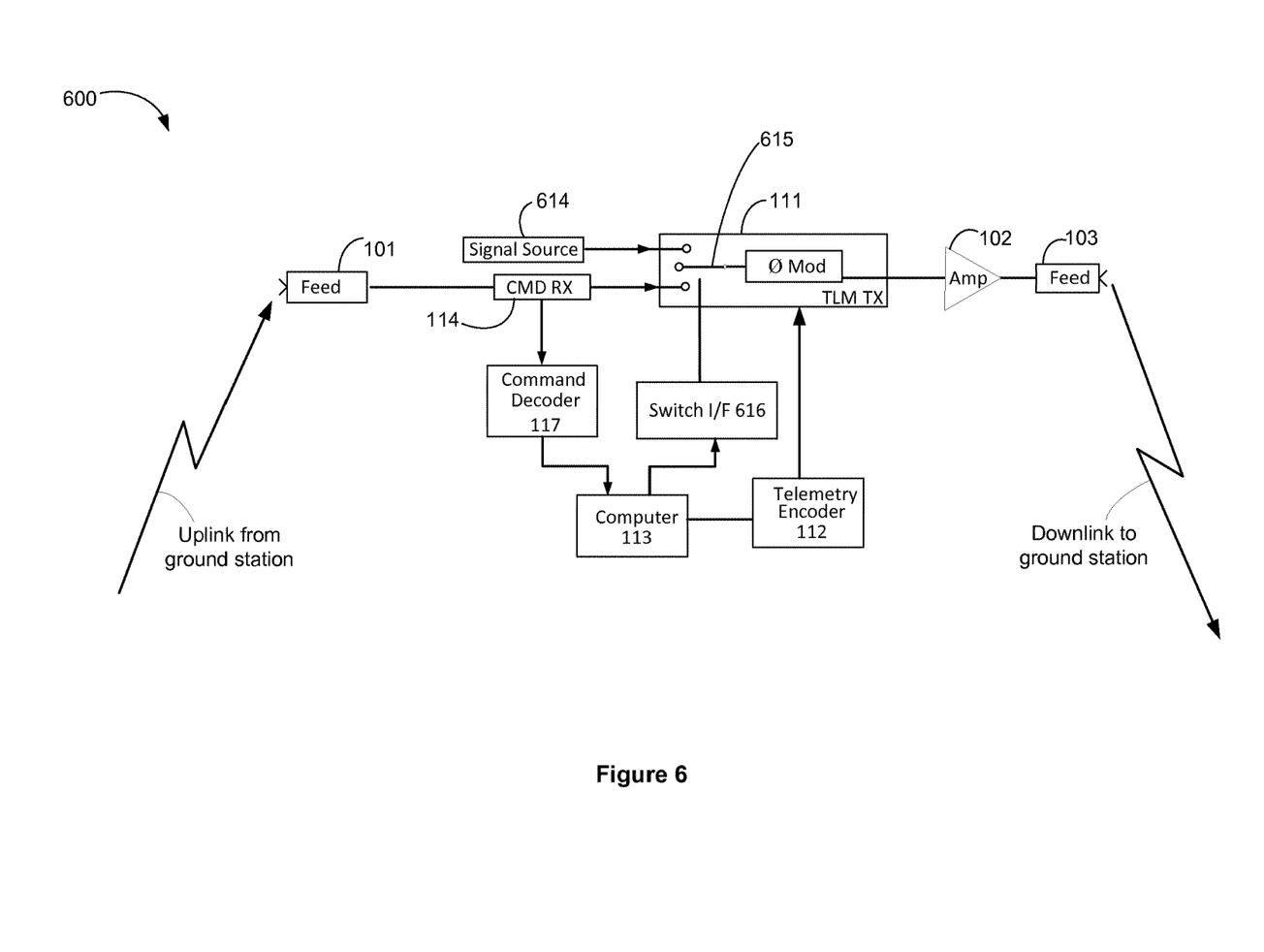
FIG. 6 illustrates a simplified block diagram of a spacecraft according to a yet further implementation.

FIG. 6 illustrates a simplified block diagram of a spacecraft 600 that includes the TLM transmitter (Tx) 111 and the TLM encoder 112. As described hereinabove, the TLM encoder 112, in the absence of a failure, encodes the telemetry data received from the on board computer 113 into a bitstream that is forwarded to the TLM transmitter 111 for modulation and transmission over a downlink to a ground station.

In the illustrated implementation, the TLM transmitter 111 may be selectably coupled with a signal source 614 or the CMD RX 114 by way of a commandable switch 615. The commandable switch 615 may in an open position open (as illustrated) or coupled with either the signal source 614 or the CMD RX 114 by way of a switch interface 616 under control of the computer 113. In some implementations, the switch interface 616 may be a module of the on board computer 113.

Thus, the signal source 614 and the CMD RX 114 may provide redundant means with which the on board computer 113 may be configured to encode telemetry data bits onto an RF carrier signal by temporally varying the position of the commandable switch 615. More particularly, telemetry data bits may be encoded onto the RF carrier signal by switching, with the commandable switch 615, a signal output from either the CMD RX 114 or the signal source 614 to the TLM transmitter 111.

Implementations of the subject matter described in this specification may be implemented as one or more computer programs, i.e., one or more modules of computer program instructions, encoded on non-transitory computer readable medium for execution by, or to control the operation of, a data processing apparatus, such as, for example, computer 113.

Thus, improved techniques for providing a redundant telemetry transmission path on a spacecraft have been disclosed. The foregoing merely illustrates principles of the invention. It will thus be appreciated that those skilled in the art will be able to devise numerous systems and methods which, although not explicitly shown or described herein, embody the principles of the invention and are thus within the spirit and scope of the invention as defined by the following claims.

What is claimed is:

1. A spacecraft comprising:
    a signal source;
    a commandable switch
    a computer;
    a TLM encoder coupled with the computer;
    a telemetry (TLM) transmitter having a modulation input coupled by the commandable switch with the signal source and having a communicative coupling with the TLM encoder that excludes the commandable switch; and
        in the absence of a failure of the TLM encoder, the TLM encoder encodes telemetry data received from the computer into a bitstream that is forwarded over the communicative coupling to the TLM transmitter for transmission over a downlink to a ground station;
        the TLM transmitter is configured to receive an output from the signal source when the commandable switch is closed; and
        the computer is configured to detect a failure of the TLM encoder, and, upon detecting the failure of the TLM encoder, encode TLM data bits onto a TLM downlink signal by actuating the commandable switch between a closed position and an open position, such that a signal from the signal source received at the modulation input by the TLM transmitter is temporally varied between an on condition and an off condition.

2. The spacecraft of claim 1, wherein the signal source is a command (CMD) receiver, the CMD receiver having an output coupled by the commandable switch with the modulation input of the TLM transmitter.

3. The spacecraft of claim 2, wherein the output from the CMD receiver results from demodulation of a modulated uplink carrier signal.

4. The spacecraft of claim 3, wherein the modulated uplink carrier signal is a ranging signal.

5. The spacecraft of claim 2, wherein the output from the CMD receiver received by the TLM transmitter is noise.

6. The spacecraft of claim 1, wherein the commandable switch is solid state.

7. The spacecraft of claim 1, wherein the computer includes at least a portion of the TLM encoder.

8. The spacecraft of claim 1, wherein the TLM data bits are encoded at a rate between 8 and 200 bits per second.

9. The spacecraft of claim 1, wherein the TLM transmitter modulates the output from the signal source received by the TLM transmitter onto an RF carrier using phase modulation or frequency modulation.

10. A method comprising:
    encoding, with a computer on board a spacecraft, telemetry (TLM) data bits onto a TLM downlink signal by actuating a commandable switch, the commandable switch being disposed between and communicatively coupled with a signal source and a telemetry (TLM) transmitter of the spacecraft; and
    transmitting, with the TLM transmitter, the encoded TLM downlink from the spacecraft to a ground station, wherein:
        the TLM transmitter is configured to receive an output from the signal source when the commandable switch is closed;
        the computer is configured to actuate the commandable switch between a closed position and an open position, such that a signal received by the TLM transmitter is temporally varied between an on condition and an off condition;
        a TLM encoder is coupled with the computer and has a communicative coupling with the TLM transmitter that excludes the commandable switch, the TLM encoder being configured to encode telemetry data received from the computer into a bitstream that is forwarded to the TLM transmitter for transmission over a downlink to the ground station; and
        the encoding the TLM data bits onto the TLM downlink signal by actuating the commandable switch is performed only after detecting a failure of the TLM encoder.

11. The method of claim 10, wherein the signal source is a command (CMD) receiver, the CMD receiver having an output coupled by the commandable switch with the modulation input of the TLM transmitter.

12. The method of claim 11, wherein the output from the CMD receiver results from demodulation of a modulated uplink carrier signal.

13. The method of claim 12, wherein the modulated uplink carrier signal is a ranging signal.

14. The method of claim 11, wherein the output from the CMD receiver received by the TLM transmitter is noise.

15. The method of claim 10, further comprising modulating the output from the signal source received by the TLM transmitter onto an RF carrier using phase modulation or frequency modulation.

16. A non-transitory computer readable medium having software stored thereon, the software including instructions for causing a computer on board a spacecraft to:
    encode telemetry (TLM) data bits onto a TLM downlink signal by actuating a commandable switch, the commandable switch being disposed between and communicatively coupled with a signal source and a TLM transmitter of the spacecraft; wherein
        the TLM transmitter is configured to receive an output from the signal source when the commandable switch is closed and to transmit the encoded TLM downlink from the spacecraft to a ground station;
        the computer is configured to actuate the commandable switch between a closed position and an open position, such that a signal received by the TLM transmitter is temporally varied between an on condition and an off condition;
        a TLM encoder is coupled with the computer and has a communicative coupling with the TLM transmitter that excludes the commandable switch, the TLM encoder being configured to encode telemetry data received from the computer into a bitstream that is forwarded to the TLM transmitter for transmission over a downlink to the ground station; and the encoding the TLM data bits onto the TLM downlink signal by actuating the commandable switch is performed only after detecting a failure of the TLM encoder.

17. The computer readable medium of claim 16, wherein the signal source is a command (CMD) receiver, the CMD receiver having an output coupled by the commandable switch with the modulation input of the TLM transmitter.

18. The method of claim 17, wherein the output from the command receiver results from demodulation of a modulated uplink carrier signal.

19. The method of claim 18 wherein the modulated uplink carrier signal is a ranging signal.

\* \* \* \* \*